Jan. 3, 1967 KATSUHITO UETAKE ET AL 3,296,570
DEVICE FOR CORRECTING DISTORTION OF DEFLECTION
IN TELEVISION RECEIVER
Filed Sept. 21, 1964 2 Sheets-Sheet 1

Jan. 3, 1967 KATSUHITO UETAKE ET AL 3,296,570

DEVICE FOR CORRECTING DISTORTION OF DEFLECTION IN TELEVISION RECEIVER

Filed Sept. 21, 1964 2 Sheets-Sheet 2

3,296,570
Patented Jan. 3, 1967

3,296,570

DEVICE FOR CORRECTING DISTORTION OF DEFLECTION IN TELEVISION RECEIVER

Katsuhito Uetake and Seishiro Iwamura, Amagasaki, Japan, assignors to Mitsubishi Denki Kabushiki Kaisha, Tokyo, Japan Filed Sept. 21, 1964, Ser. No. 397,918
Claims priority, application Japan, Sept. 23, 1963, 38/71,907
5 Claims. (Cl. 335—212)

This invention relates in general to a television receiver and more particularly to a device for correcting the distortion of deflection in a television receiver.

Heretofore there have been proposed various devices for correcting distortion of deflection of an image reproduced on a phosphor screen of a cathode ray tube. However the known devices were generally complicated in construction. Such devices could correct the distortion of deflection symmetrical longitudinally and transversely with respect to the center of the image but most of them could not satisfactorily correct the distortion of deflection asymmetrical longitudinally and/or transversely with respect to the center of the image.

Therefore the chief object of the invention is to provide an improved device for correcting the distortion of deflection of an image reproduced on a phosphor screen of a cathode ray tube which is not only of a simple construction and easily operated but also reliable in operation.

With the above object in view, the invention resides in a device for correcting the distortion of deflection of an image reproduced on a phosphor screen of a cathode ray tube, comprising a deflection coil disposed around the neck portion thereof, said device including a supporting strip of non-magnetic material for surrounding said deflection coil, a plurality of adjusting elements each including a permanent magnet and a pair of magnetic pole plates of soft magnetic material for rotatably sandwiching said permanent magnet, said plurality of adjusting elements being secured to said supporting strip for circumferentially sliding movement.

The invention will become more readily apparent from the following exemplary description taken in conjunction with the accompanying drawings in which.

Throughout several figures the same reference numerals designate similar components.

Figure 1:
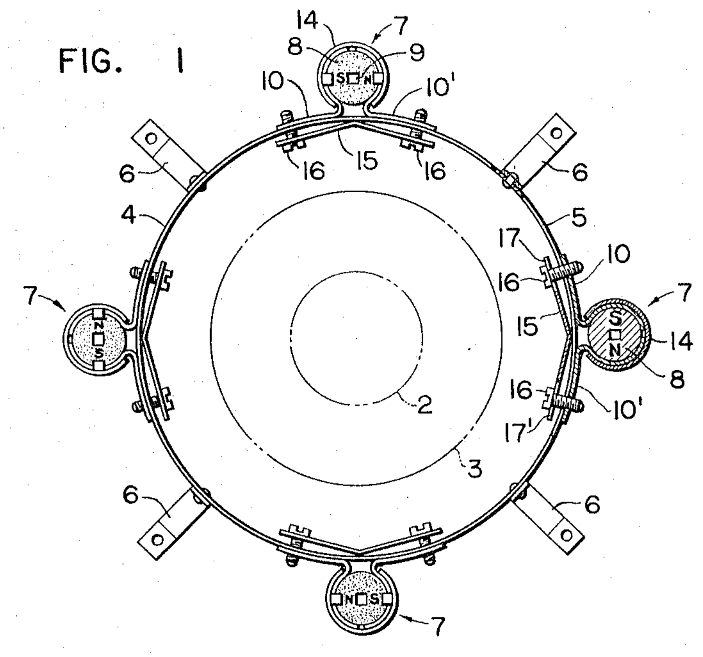
FIG. 1 shows a front view, partly in section of a device for correcting the distortion of deflection according to the teachings of the invention.
Figure 2:
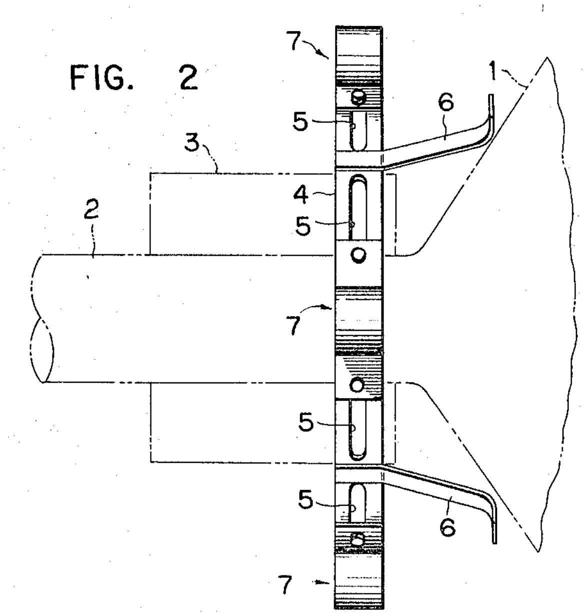
FIG. 2 shows a side elevational view of the device illustrated in FIG. 1.
Figure 3:
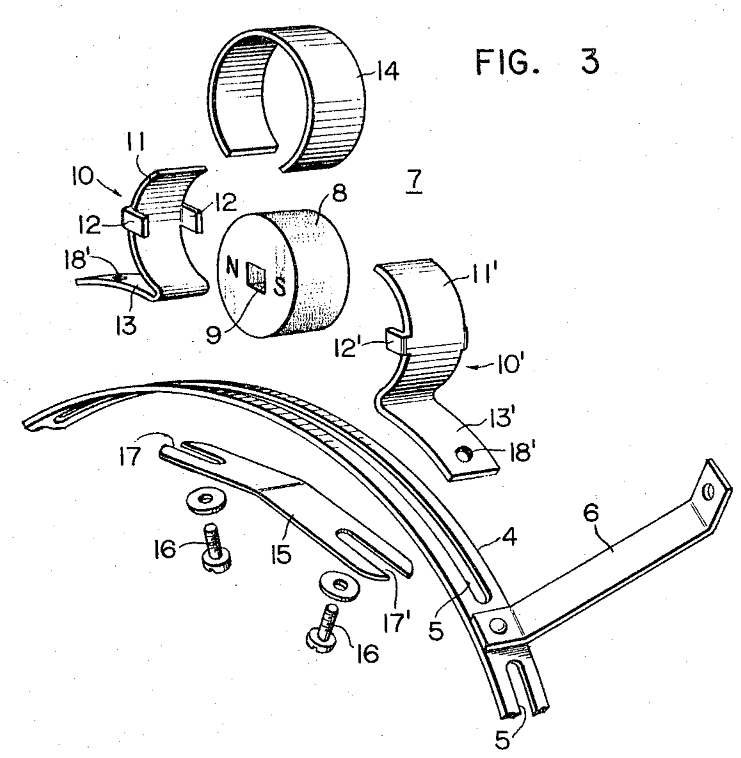
FIG. 3 shows an exploded perspective view of an adjusting element used in the device illustrated in FIGS. 1 and 3.

Referring now to the reference numerals shown in FIGS. 1 through 3, 1 designates a cathode ray tube provided around the neck portion 2 with a deflection coil 3, and 4 designates an annular supporting strip surrounding the deflection coil 3 with a predetermined spacing formed therebetween. The supporting strip 4 is made of any suitable non-magnetic material such as brass sheet and includes a plurality of longitudinally elongated slots 5 of a predetermined length formed thereon. In the illustrated embodiment, four of such slots are formed on the supporting strip in such positions that, when assembled, their centers are positioned on the longitudinal and transverse axes of the cross section of the neck portion 2 as clearly shown in FIG. 1. The supporting strip 4 is held in place by having a plurality of arms 6 rigidly secured thereto and laterally projecting from the strip. 7 designates generally an adjusting element associated with each of the elongated slots 5 on the supporting strip 4. In the illustrated embodiment, four adjusting elements 7 are provided because of the use of four slots 5.

The adjusting element 7 comprises a permanent magnet 8 of cylindrical shape formed with a central square hole 9 into which a screw driver may be inserted for the purpose of rotating the magnet about its longitudinal axis. The permanent magnet has a north and a south pole on its peripheral surface (see FIG. 3) and may be of a ceramic type. A pair of pole plates 10 and 10' of any suitable magnetic material laterally sandwich the permanent magnet 8 for rotational movement. The pole plates may be preferably made of a soft magnetic material, low in residual magnetism, such as soft iron. As best shown in FIG. 3, each of the pole plate 10 or 10' includes a holding portion 11 or 11' adapted to be put in intimate contact with the adjacent portion of the peripheral surface of the permanent magnet 8, a projection 12 or 12' formed on either side for preventing the permanent magnet 8 from disengaging from the associated holding portion, and a leg portion 13 or 13' adapted to rest on the outer surface of the supporting strip 4.

In order for the pole plates 10 and 10' to firmly grasp the permanent magnet 8 between the holding portions 11 and 11' thereof, a C-shaped leaf spring 14 of any suitable non-magnetic material such as phosphor bronze is fitted onto the holding portions of the pole plates which, in turn, sandwich the permanent magnet. In order to secure on the supporting strip 4 the assembly of the permanent magnet 8 and the pair of pole plates 10 and 10', a folded leaf spring 15 of any suitable non-magnetic material such as phosphor bronze is disposed oppositely to the leg portions 13 and 13' with the slotted portion of the supporting strip 4 interposed therebetween. Then a bolt or screw 16 or 16' is threadedly screwed through a notch 17 or 17' formed on either end portion of the leaf spring 15 and the elongated slots 5 on the supporting strip 4 into a threaded aperture 18 or 18' formed on the leg portion 13 or 13' of the pole plates 10 or 10'. With this arrangement, the bolts 16 and 16' serve to transmit the resilience of the leaf spring 15 to the holding portions 13 and 13' thereby to continuously press these holding portions against the outer peripheral surface of the supporting strip 4 with the result that the adjusting element 7 tending to slide circumferentially of the strip 4 is held in place on the strip.

Figure 4A:
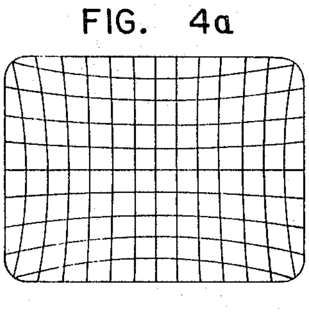
FIGS. 4*a*, 4*b* and 4*c* show diagrammatically images of a test pattern reproduced on a phosphor screen of a cathode ray tube.
Figure 4B:
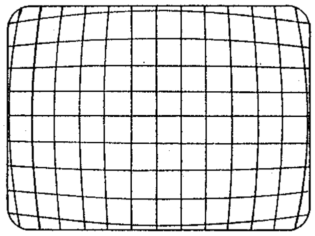
Figure 4C:
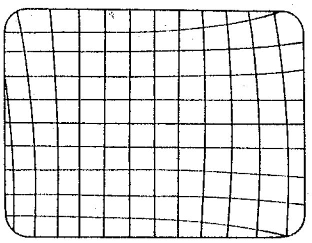

The conventional type of devices for correcting the distortion of deflection have the disadvantages as previously described. More specifically, such devices could be complicated in construction. Alternatively they could only correct the distortion of deflection symmetrical longitudinally and transversely with respect to the center of an image reproduced on a phosphor screen of a cathode ray tube such as shown in FIGS. 4*a* and 4*b*. However, most of them could not correct the distortion of deflection asymmetrical longitudinally and/or transversely with respect to the center of the reproduced image such as shown in FIG. 4*c*.

In contrast, the device of the invention is not only extremely simple in both construction and operation but also very reliable in the correcting function because of the above mentioned construction comprising the supporting strip 4 of any suitable non-magnetic material surrounding the deflection coil 3 for the cathode ray tube 1, a plurality of adjusting elements 7 each including the permanent magnet 8 and a pair of pole plates 10 and 10' for sandwiching the magnet 8 therebetween, the adjusting elements being mounted on the supporting strip 4 for circumferentially sliding movement. Also a rotational movement of the permanent magnet 8 relative to the pole plates 10 and 10' can cause a change in position of the magnet relative to the pole plates thereby to control the strength of magnetic field established by the permanent magnet. In addition, a circumferentially sliding movement of one or more adjusting elements 7 along the support strip 4 can adjust the slope of a scanning line of an electron beam relative to the longitudinal or transverse axis of the phosphor screen. Thus the invention is possible to correct the distortion of deflection regardless of its form.

While the invention has been described in conjunction with a single preferred embodiment thereof, it is to be understood that various change in the detail of construction and the combination and arrangement of parts without departing from the spirit and scope of the invention.

What we claim is:

1. In a television receiver comprising a cathode ray tube including a neck portion and a deflection coil disposed around the neck portion, a device for correcting distortion of deflection of an electron beam, comprising, in combination, an annular supporting band of non-magnetic material surrounding said deflection coil and provided with a plurality of circumferentially elongated slots, a plurality of adjusting elements movably secured in spaced relationship on the outer face of said supporting band, each of said adjusting elements including a permanent magnet, a pair of pole plates of soft magnetic material having portions for rotatably holding said permanent magnet between them and portions engaging the outer face of said band, a leaf spring of non-magnetic material engaging the inner face of said band opposite said pole plates, said leaf spring being bent to form an angle projecting toward the supporting band, and a pair of fasteners extending through the associated one of said elongated slots in said supporting band to resiliently couple said leaf spring to the associated pair of pole plates whereby each of said adjusting elements is held in position on the outer face of said supporting band and is adjustable circumferentially of said band.

2. A device according to claim 1, in which said magnets are cylindrical and said pole plates associated with each magnet have arcuate portions which are spaced apart circumferentially from one another and embrace said magnet between them.

3. A device according to claim 2, further comprising a resilient C-shaped leaf spring of non-magnetic material fitting over said arcuate holding portions of said pole plates and pressing them against the respective magnet.

4. A device according to claim 2, in which side projections on said arcuate holding portions of said pole plates engage opposite ends of said magnets to retain said magnets in an axial direction.

5. A device according to claim 2, in which each of said magnet is a ceramic magnet having north and south poles on the opposite portions of the periphery thereof.

References Cited by the Examiner

UNITED STATES PATENTS

| | | | |
|---|---|---|---|
| 2,541,446 | 2/1951 | Trott | 313—77 |
| 2,591,159 | 4/1952 | Kabus | 317—200 X |
| 2,900,544 | 8/1959 | Cunniff | 317—200 X |
| 2,903,689 | 9/1959 | Scanlon | 317—200 X |

BERNARD A. GILHEANY, *Primary Examiner.*

G. HARRIS, *Assistant Examiner.*